W. R. BAKER.
Grain-Binder.
No. 215,553. Patented May 20, 1879.

WITNESSES
Wm. A. Skinkle
Geo. W. Breck

INVENTOR
William R. Baker,
By his Attorneys
Baldwin, Hopkins, & Peyton.

3 Sheets—Sheet 3.
W. R. BAKER.
Grain-Binder.
No. 215,553. Patented May 20, 1879.
Fig 3.
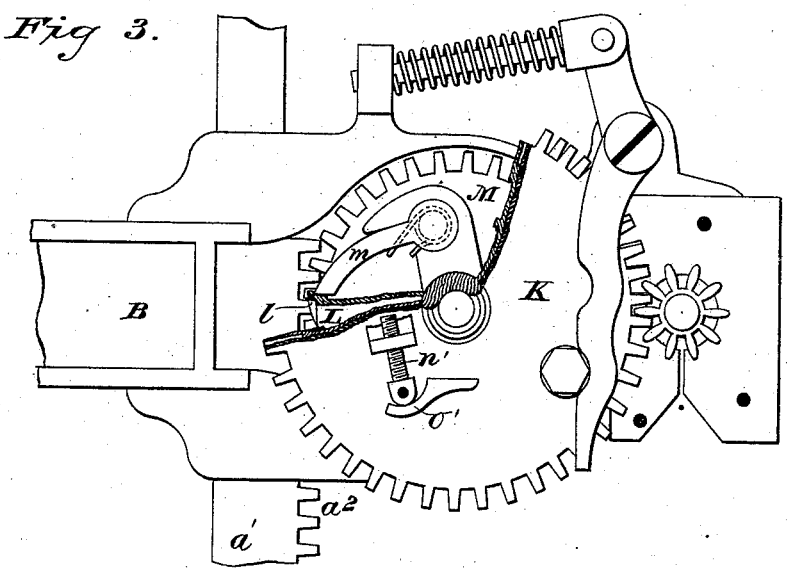
Fig 4.
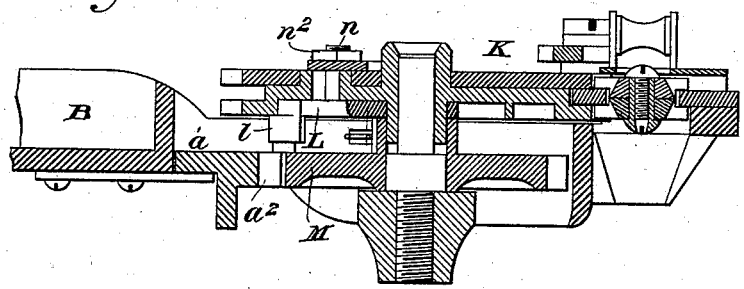
Fig 6.
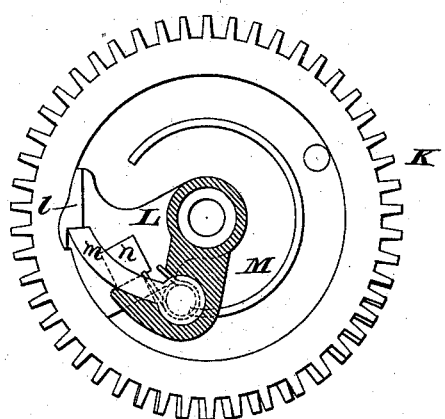
Fig 5.
WITNESSES
Wm A Skinkle
Geo W Breck
INVENTOR
William R. Baker,
By his Attorneys
Baldwin, Hopkins, & Peyton.

UNITED STATES PATENT OFFICE.

WILLIAM R. BAKER, OF CHICAGO, ILLINOIS, ASSIGNOR TO C. H. AND L. J. McCORMICK, OF SAME PLACE.

IMPROVEMENT IN GRAIN-BINDERS.

Specification forming part of Letters Patent No. 215,553, dated May 20, 1879; application filed April 14, 1879.

*To all whom it may concern:*

Be it known that I, WILLIAM R. BAKER, of Chicago, in the county of Cook and State of Illinois, have invented a new and useful Improvement in Grain-Binders, of which the following is a specification.

My invention relates to and constitutes an improvement upon the well-known "McCormick binder," more especially as exemplified in Letters Patent No. 191,096, granted to me May 22, 1877; No. 201,149, granted to myself and C. B. Withington March 12, 1878, and reissued May 6, 1879, as No. 8,702, and No. 205,067, granted to Lambert Erpelding June 18, 1878. In fact, the patent of Withington and Baker, No. 201,149, granted March 12, 1878, above mentioned, shows the mechanism herein claimed embodied in a machine representing the reciprocating binding-carriage, the crank, the driving-chain, and the locking-latch, which combined constitute Withington's sole invention, as also our joint invention of the combination of the differential gear and actuating push-bar; and the said reissue of May 6, 1879, No. 8,702, was taken out to cover the joint invention only, and to eliminate the sole inventions of said Withington and myself.

The object of my invention is to provide means for adjusting the differential gear, which actuates the twister, to compensate for displacement or derangement caused by wear or stretching of the driving-chain, which end I attain by mounting the lug upon which the pawl of the gear-wheel, which drives the differential gear, twister, and cutter, acts upon a movable or turning plate, pivoted concentrically upon the differential gear, and provided with adjusting mechanism, so that the teeth of the differential gear can be adjusted to compensate for variations in the length of the driving-chain.

Figure 1:
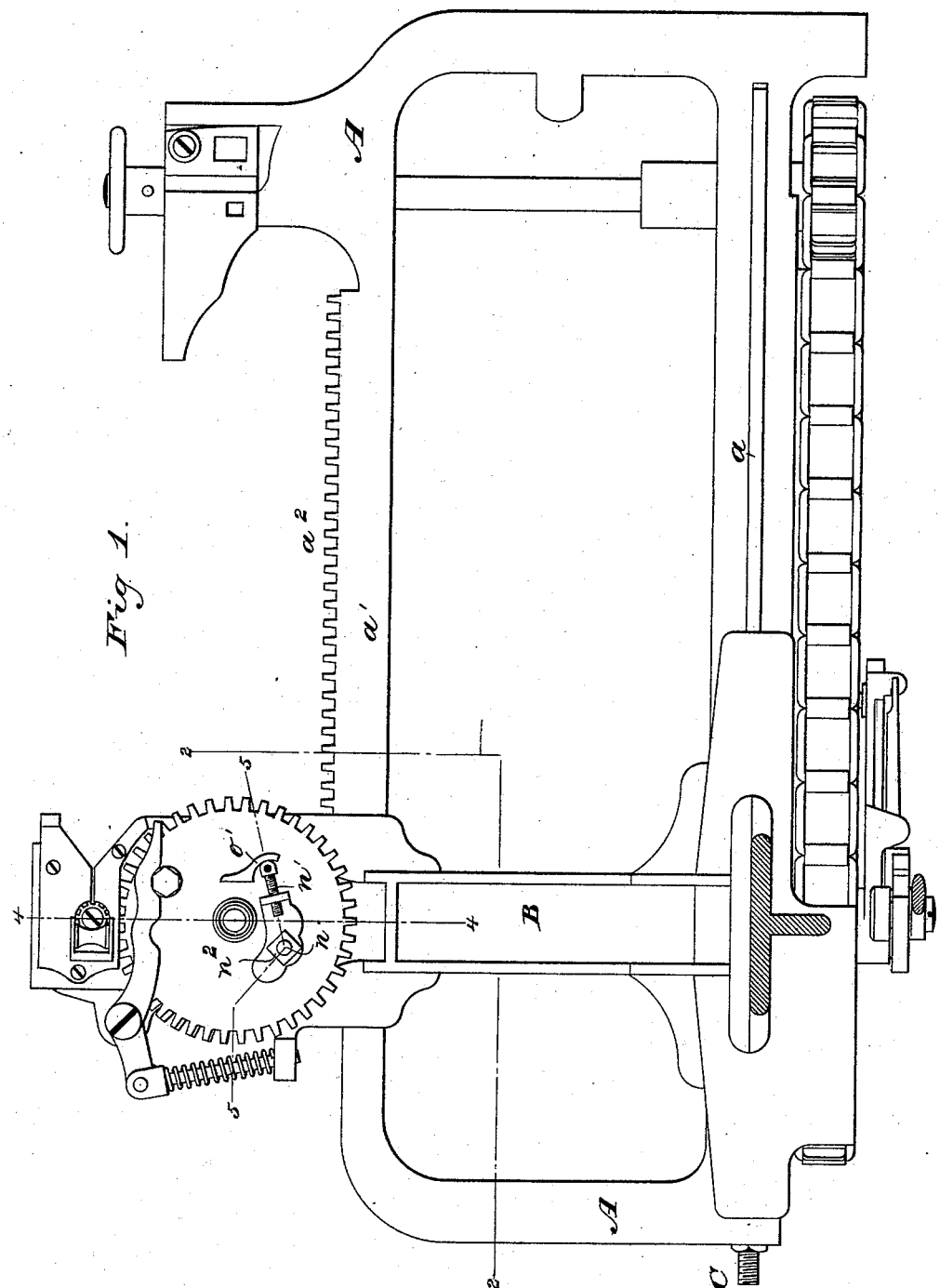
Figure 2:
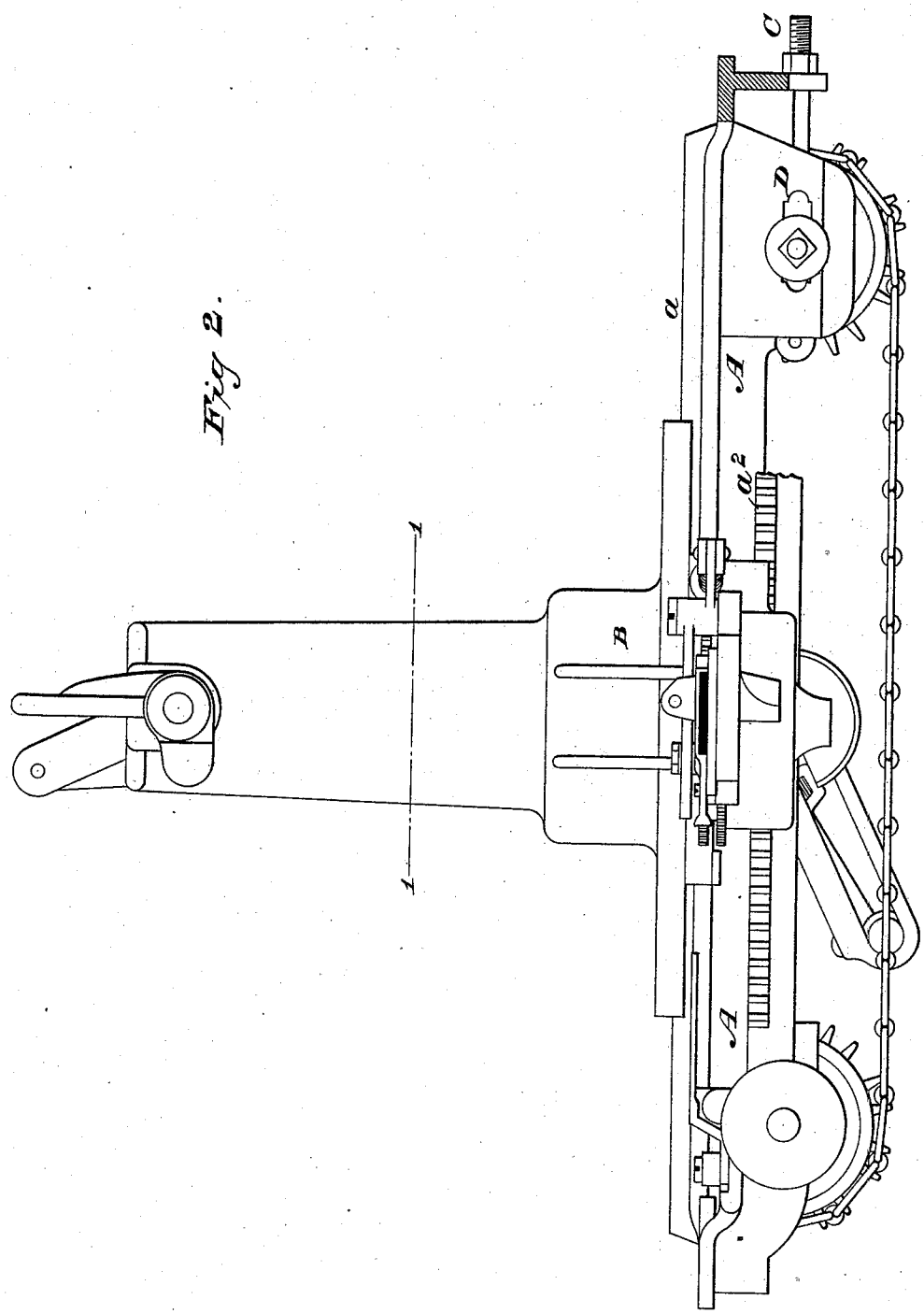

In the accompanying drawings, which represent as much of a McCormick binder with my improvements applied thereto as is necessary to illustrate the subject-matter herein claimed, Figure 1 is a plan or top view, partly in section, on the line 1 1 of Fig. 2. Fig. 2 is a sectional elevation on the line 2 2 of Fig. 1, showing the binding-carriage about midway of its traverse. Fig. 3 is a plan or top view of the differential gear and twisting mechanism with parts broken away to more clearly show the construction. Fig. 4 is a section through the differential gear and twisting mechanism on the line 4 4 of Fig. 1. Fig. 5 is a similar section on the line 5 5 of Fig. 1; and Fig. 6 is a section on the line 6 6 of Fig. 5, showing the under side of the differential gear.

It is deemed unnecessary to describe in detail the construction of the binder, as it is fully exemplified in the patents hereinbefore referred to.

The binder-frame A is shown as provided with ways $a\ a^1$, upon which the binding-carriage B reciprocates, and with a rack, $a^2$, for actuating the twisting mechanism. The binding-carriage is reciprocated by means of a driving-chain running over sprocket-wheels, and driven in usual well-known ways. The chain is tightened, to compensate for wear, by means of an adjusting-screw, C, which controls the movable bearing D, in which one of the sprocket-wheels is mounted.

The differential gear K, which drives the cutters and twisting mechanism, is, in its general construction, similar to that shown and described in the patent of Erpelding above mentioned. It is, however, for convenience of construction, shown in the drawings as made in two sections or disks bolted together.

Experience has demonstrated that as the relation of the teeth of the twister-pinion to the mouth of the cutter-head—or, in other words, to the slot in the twister-plate—is dependent upon the relation of the stationary rack to the differential gear, and as this relation in turn is dependent upon the length of the driving-chain, the wearing or stretching of the driving-chain sometimes throws the teeth of the sectional twister or cutter into improper relation to the slot in the twister-plate.

I obviate this objection by mounting the lug $l$ (upon which the pawl $m$ of the driving-gear M acts to move the differential gearing, and consequently the twister-pinions) upon a plate, L, pivoted concentrically upon the axis of the differential gear, and capable of a slight turning movement thereon. A bolt, $n$, secured to this plate, extends up through a slot in the differential gear, and is provided with a set-screw, $n^1$, abutting against a lug, $o'$, on the gear, to adjust the relation of the lug $l$ to its driving-pawl. A clamp-nut, $n^2$, on the stud $n$ serves to lock the parts securely in position when adjusted.

By this mode of construction I am enabled when the chain becomes too long by wear to shorten it by taking out a link, and still to preserve the proper relation of the teeth of the cutter-pinion to the slot in the twister-plate.

What I claim as my own invention, and desire to secure by Letters Patent, is—

The combination, substantially as hereinbefore set forth, of the lug on the turning-plate and mechanism for securing said plate when adjusted, mounted upon the differential gear, which actuates the twister, whereby the proper relation of the twister to the slot in its plate is preserved notwithstanding variations in the length of the driving-chain.

I testimony whereof I have hereunto subscribed my name.

WM. R. BAKER.

Witnesses:
JOHN V. A. HASBROOK,
JOHN BIRKHOLZ.